No. 898,181. PATENTED SEPT. 8, 1908.
J. BULOVA.
BRACELET.
APPLICATION FILED APR. 3, 1908.

Witnesses:
Arthur E. Juniper
W. R. Schulz

Inventor
Joseph Bulova
By his Attorney

UNITED STATES PATENT OFFICE.

JOSEPH BULOVA, OF NEW YORK, N. Y.

BRACELET.

No. 898,181.   Specification of Letters Patent.   Patented Sept. 8, 1908.

Application filed April 3, 1908. Serial No. 424,902.

*To all whom it may concern:*

Be it known that I, JOSEPH BULOVA, a citizen of the United States, residing at New York city, Manhattan, county and State of New York, have invented new and useful Improvements in Bracelets, of which the following is a specification.

This invention relates to an improved bracelet and more particularly to improved means for effecting an easy and reliable closing thereof.

Figure 1:
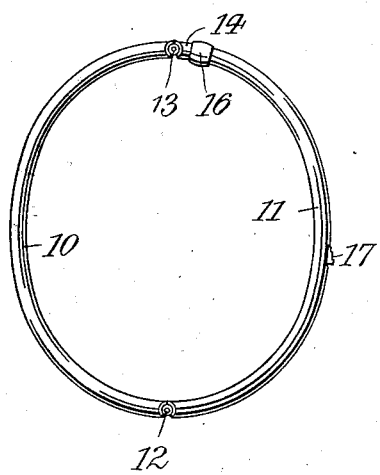
Figure 2:
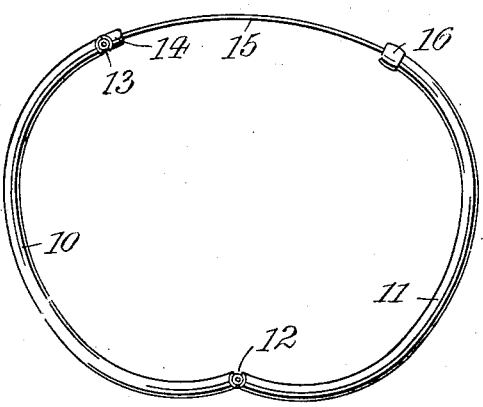
Figure 3:
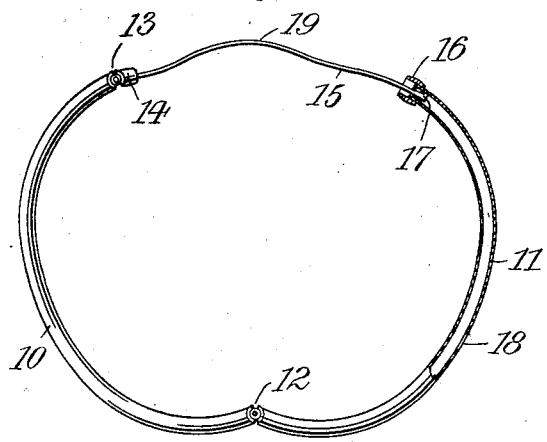
Figure 4:
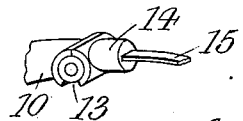

In the accompanying drawing: Figure 1 is a face view of my improved bracelet, showing it closed; Fig. 2 a similar view, showing it open; Fig. 3 a view similar to Fig. 2, showing the spring-arm bent, and Fig. 4 a detail of the stud.

The bracelet is composed of two curved members 10, 11, pivotally connected as at 12.
To the free end of member 10 there is connected by a stop-hinge 13, a stud 14, from which extends a curved spring arm 15. Stop-hinge 13 is so constructed that stud 14 may be readily swung inwards, but cannot be tilted outward beyond the outer periphery of the bracelet. Member 11 is made tubular to admit spring arm 15, and its free end is enlarged to form a socket 16 adapted to accommodate stud 14. A catch 17 at the free end of arm 15, adapted to engage a slot 18 of tubular member 11, locks the bracelet in its closed position.

When the bracelet is to be closed upon the wrist, the free ends of members 10, 11, are pushed towards each other, as usual. During this operation arm 15 must adapt itself to the form of member 11 into which it enters. As the curvature of member 11, at its upper end, exceeds that of arm 15, as will be readily seen from Fig. 2, the free end of arm 15 is slightly bent inwards while being pushed into member 11. The inward movement of that portion of spring arm 15 which is received within member 11, will cause a corresponding outward movement of the arm-portion located between stud 14 and socket 16, so that during each closing operation of the bracelet, spring arm 15 will have the tendency to bulge outwards. It is thus apparent that if a stopless hinge were used instead of stop-hinge 13, arm 15 would occasionally become bulged outward to such an extent that a break of the arm would be liable to occur, which is entirely prevented by the use of the stop-hinge described. Furthermore, after a bracelet has been worn for some time, it frequently happens that the spring arm becomes bulged, as at 19, (Fig. 3), or may assume any other irregular shape owing to the crowding of the hand into the open bracelet. In this case arm 15 may readily yield at its foot and swing inward whenever the shape of arm 15 requires such movement in order to pass through socket 16. Any excessive outward bulging of arm 15, however, is here again effectively prevented by the stop-hinge, so that a break of arm 15 is prevented. In this way the bracelet may be readily closed under all conditions without causing any buckling or jamming of its parts.

I claim:

1. A bracelet provided with a first member, a second tubular member pivoted thereto, a spring arm adapted to enter the second member, and a stop-hinge connecting said arm to the first member, substantially as specified.

2. A bracelet provided with a first member, a second tubular member pivoted thereto, a stud, a stop-hinge connecting said stud to the first member, and a spring arm connected to the stud and adapted to enter the second member, substantially as specified.

Signed by me at New York city, (Manhattan,) N. Y., this 1st day of April, 1908.

JOSEPH BULOVA.

Witnesses:
W. R. SCHULZ,
FRANK V. BRIESEN.